June 23, 1936.                S. B. BLAISDELL                2,045,515
                    CONVERTIBLE BASE FOR BRAIDING MACHINES
                    Filed Jan. 11, 1935        7 Sheets—Sheet 1
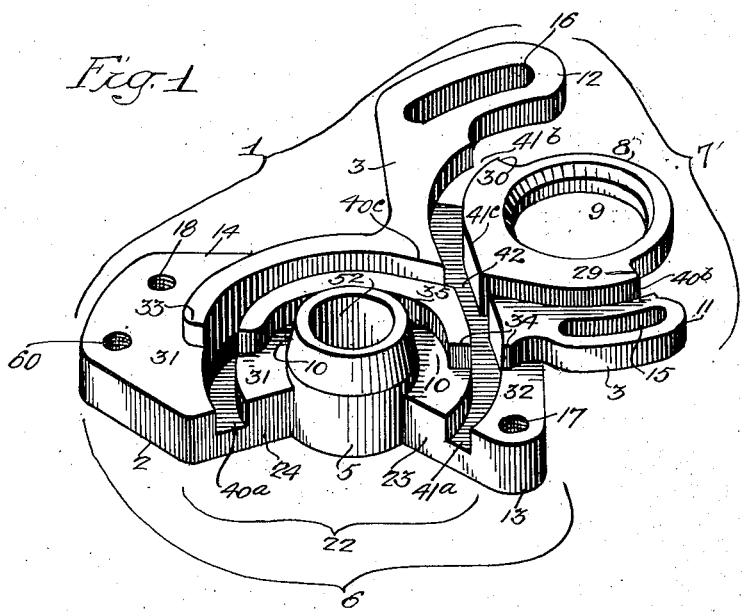
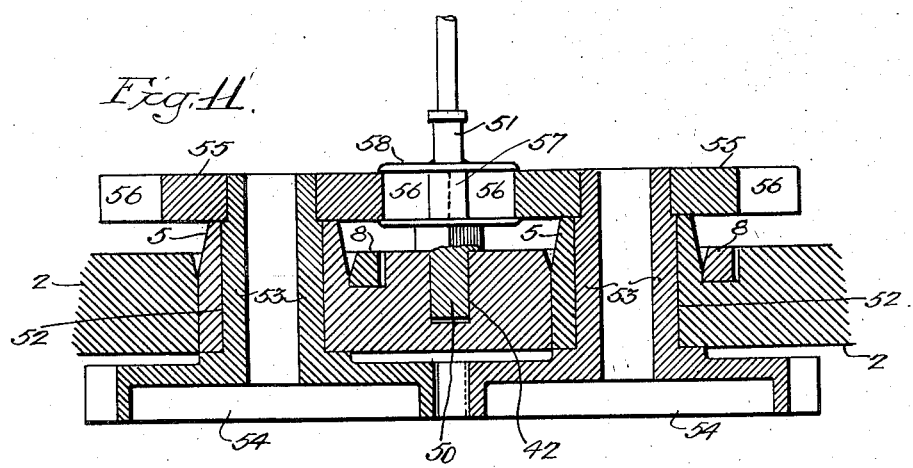
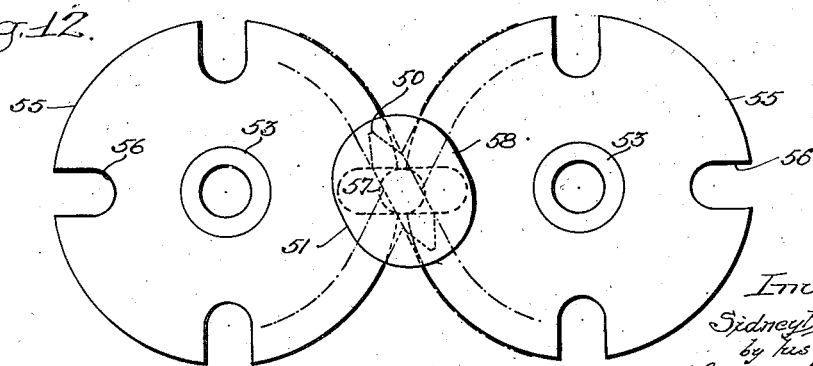
Inventor:
Sidney B. Blaisdell
by his Attorneys
Howson & Howson June 23, 1936.  S. B. BLAISDELL  2,045,515
CONVERTIBLE BASE FOR BRAIDING MACHINES
Filed Jan. 11, 1935  7 Sheets-Sheet 2
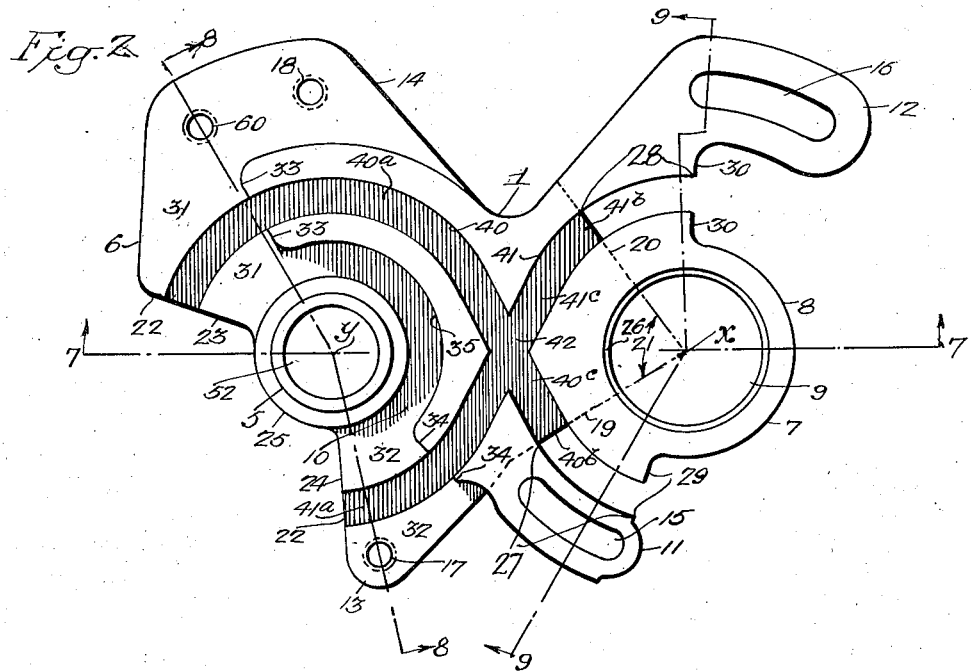
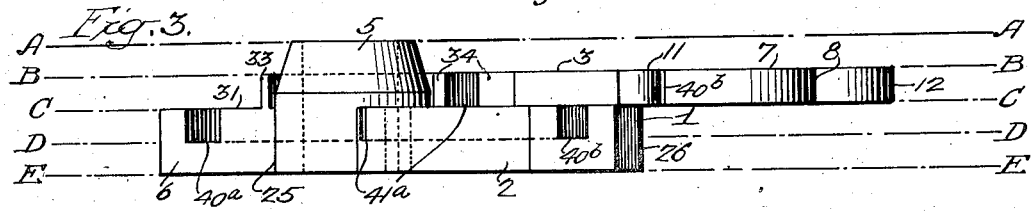
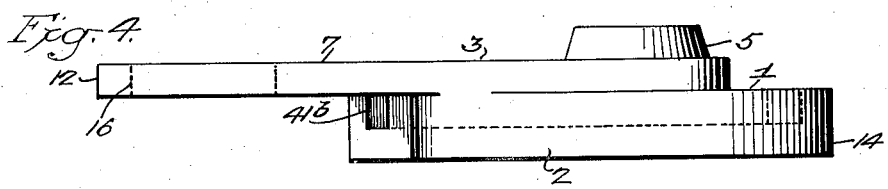
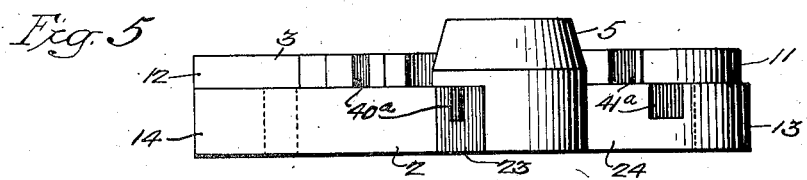
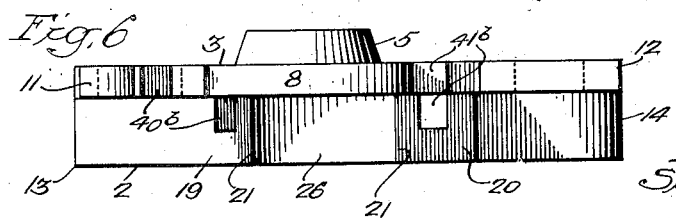

June 23, 1936. S. B. BLAISDELL 2,045,515
CONVERTIBLE BASE FOR BRAIDING MACHINES
Filed Jan. 11, 1935 7 Sheets-Sheet 3
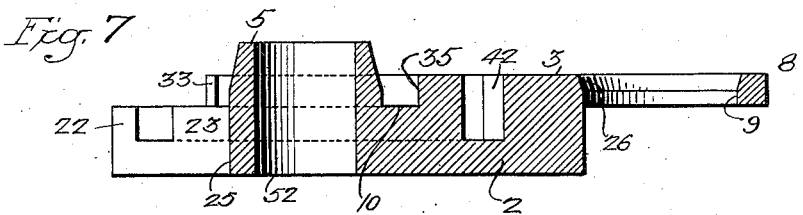
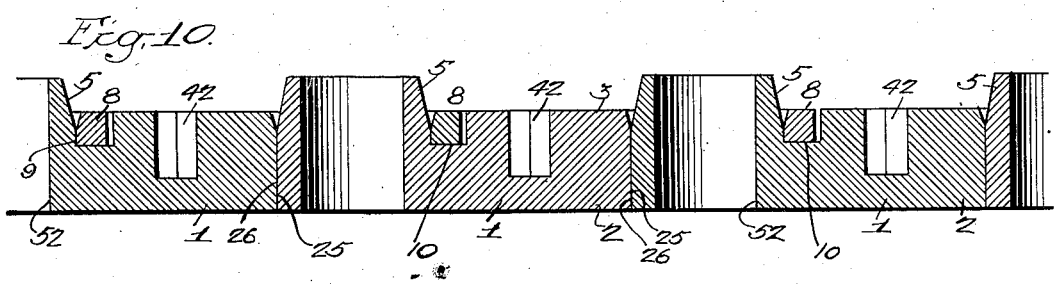
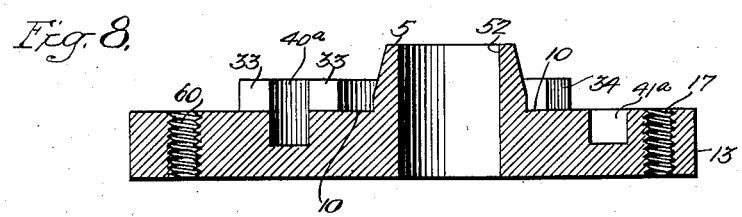
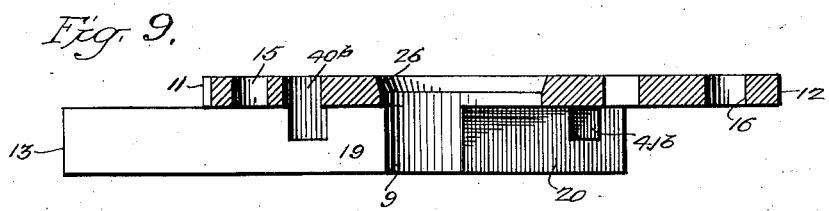
Inventor
Sidney B. Blaisdell
by his Attorneys
Howson & Howson June 23, 1936.  S. B. BLAISDELL  2,045,515
CONVERTIBLE BASE FOR BRAIDING MACHINES
Filed Jan. 11, 1935   7 Sheets—Sheet 4

Inventor:
Sidney B. Blaisdell
by his Attorneys
Howson & Howson

June 23, 1936.  S. B. BLAISDELL  2,045,515
CONVERTIBLE BASE FOR BRAIDING MACHINES
Filed Jan. 11, 1935  7 Sheets-Sheet 5

Inventor:
Sidney B. Blaisdell
by his Attorneys
Howson & Howson

June 23, 1936.  S. B. BLAISDELL  2,045,515
CONVERTIBLE BASE FOR BRAIDING MACHINES
Filed Jan. 11, 1935  7 Sheets-Sheet 6

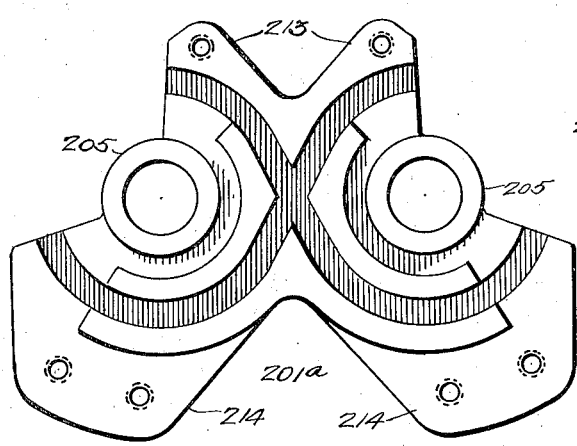
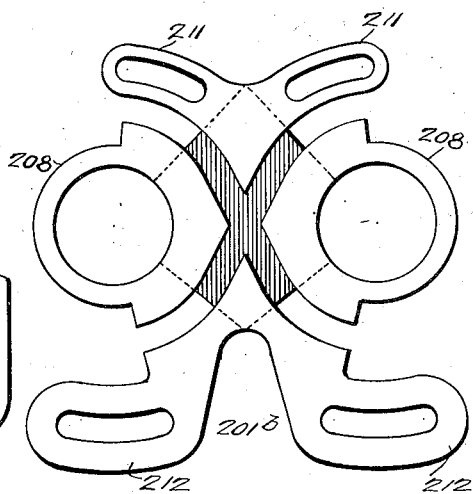
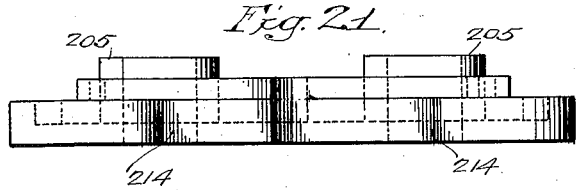
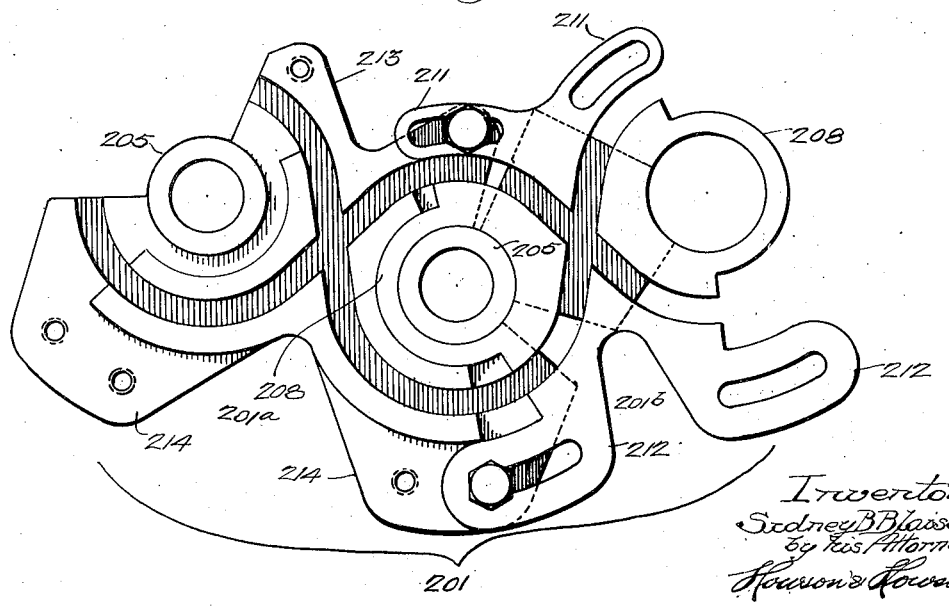

Patented June 23, 1936

2,045,515

UNITED STATES PATENT OFFICE 2,045,515

CONVERTIBLE BASE FOR BRAIDING MACHINES

Sidney B. Blaisdell, Wyncote, Pa., assignor to Fidelity Machine Company, Wilmington, Del., a corporation of Delaware Application January 11, 1935, Serial No. 1,413

28 Claims. (Cl. 96—8)

This invention relates to the base plates and carrier raceway plates of braiding machines. The primary object of the present invention is to combine the functions of the two plates in one plate and to make the one plate of a plurality of interchangeable units whereby a machine may be originally assembled and/or subsequently converted to use any desired number of carriers within a predetermined range.

Single braiding heads heretofore have been made to use as many as one hundred and twenty-nine carriers. Within the range of greatest commercial demand braiding machines employ anywhere from twelve to seventy-three carriers. The number of carriers in the different single head machines usually vary in units of four, i. e. a single head may have 12, 13, 16, 17, 20, 21, 24, 25, 28, 29, 32, 33, 36, 37, 40, 41, 44, 45, 48, 49, 52, 53, 56, 57, 64, 65, 72 or 73 carriers, making 28 different machine sizes within the normal commercial range.

The higher range, which is considered more or less in the class of special machines, includes single heads having, for example, 76, 77, 80, 81, 84, 85, 92, 93, 96, 97, 100, 108, 109 and 129 carriers respectively, or 14 different machine sizes.

The machines of both the commercial and higher ranges normally employ a raceway plate provided with two continuous intertwining carrier paths composed of a series of small substantially circular portions connected by substantially straight intersecting portions. The machines of the range employing less than 9 carriers, to a great extent, employ single figure eight carrier paths.

For each of the 28 different sizes within the commercial range, and for each of the 14 sizes within the higher range, the machine builder is required to make and keep in stock a large number of rough or finished castings including a base plate and a carrier raceway plate for each size and a large number of raceway-quoit plates for each size of machine, in order to be able to make prompt delivery of any of these machines, or replacement parts therefor, for which orders may be received.

In the assembled machines of the prior art the carrier raceway plate is disposed in superposed and relatively spaced relation to the base plate and the base plate supports those portions of the raceway plate, known as the quoits, which lie at the centers of and solely within the small intercommunicating substantially circular portions of the raceways which collectively constitute the continuous intertwining carrier paths.

The quoits assist in the forming of the slots in the raceway through which the combined guiding and driving lugs of the respective carriers project. The drive portions of the carrier lugs are adapted to be engaged by the forks or horns respectively carried by intermeshing drive gears which are disposed and rotate in a plane between the base plate and the raceway plate. These drive gears are rotatably mounted on and revolve about posts which support the quoits.

The present invention is predicated upon the idea of forming a single bed plate to function as a combined base plate and raceway plate for a braiding machine within the above noted commercial and high ranges, by forming the bed plate of a series of identical interchangeable and interconnectible units, wherein each unit will include predetermined segmental and intersecting portions of the two intertwining carrier guide paths of the machine, which, when the number of units necessary for making up a bed plate for a machine of a given size are joined together, form the complete pair of endless intertwining paths to be followed by the carriers of the machine.

The bed plate units for the commercial range, for the sake of simplicity of construction, are made in two different sets, one set being adapted to cover the lower end of the commercial range, for example the 12, 13, 16, 17, 20, 21, 24 and 25 carrier machines, while the other set is adapted to cover all sizes from and including the 24 to the 73 carrier size machines. The units for the high range are made up as a third set.

The purpose of the invention is to eliminate the necessity for the machine builder to keep on hand the above noted large number of different sized base plate patterns or castings, the large number of different sized raceway patterns or castings, and the large number of differently sized and shaped quoits necessary for completing the raceways, as the quoits for each different size machine vary in shape and size, to some extent, in accordance with the size of the machine.

According to the present invention, the machine builder need have on hand merely a large number of each of the three different sets of interchangeable units forming the subject matter of the present invention in order to make up a bed plate for any machine within the above noted commercial or high range, for which he may receive an order.

In any case each bed plate unit of each set, according to the present invention, will be made substantially as shown in the accompanying drawings, of which:

Fig. 1 is a detached perspective view of one of the interchangeable and interconnectible units of the set adapted for producing machines of the lower end of the commercial range;

Fig. 2 is a plan view;

Fig. 3 is a front elevation;

Fig. 4 is a rear elevation;

Fig. 5 is a left end elevation;

Figure 13:
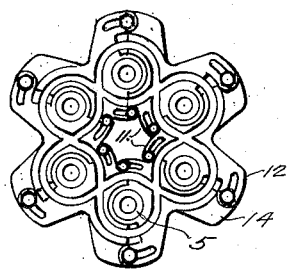
Figure 14:
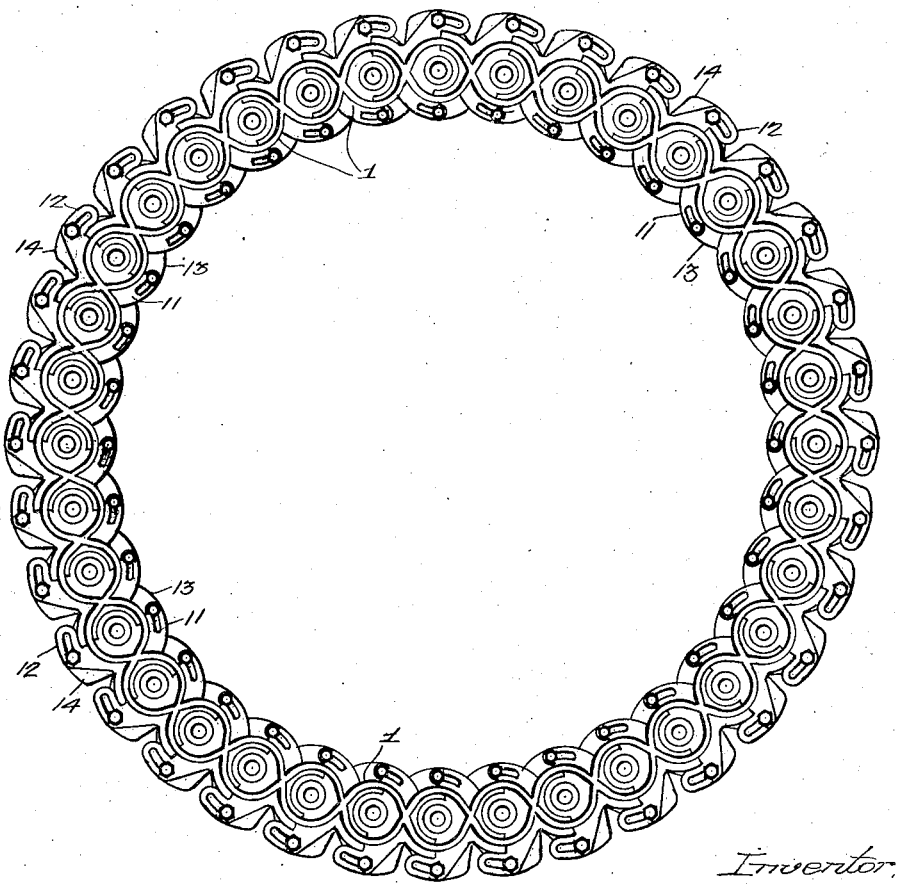
Figure 16:
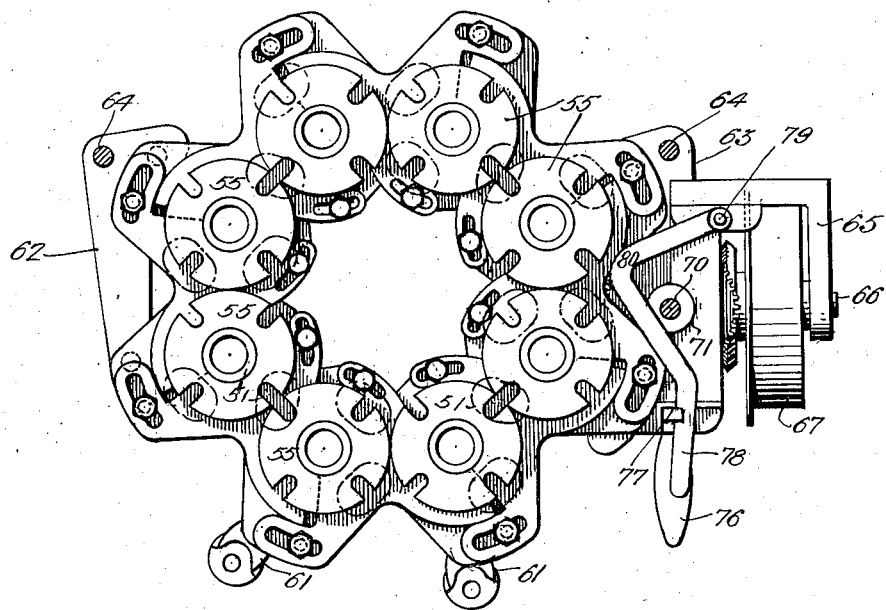
Figure 15:
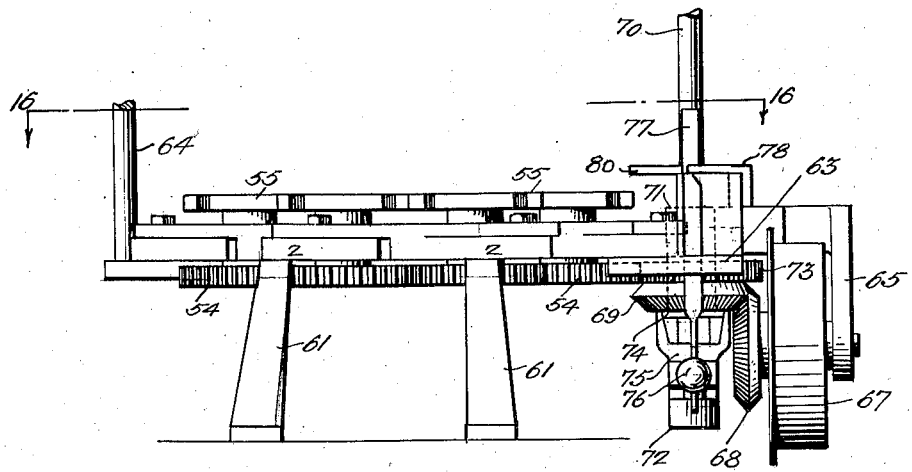
Figure 17:
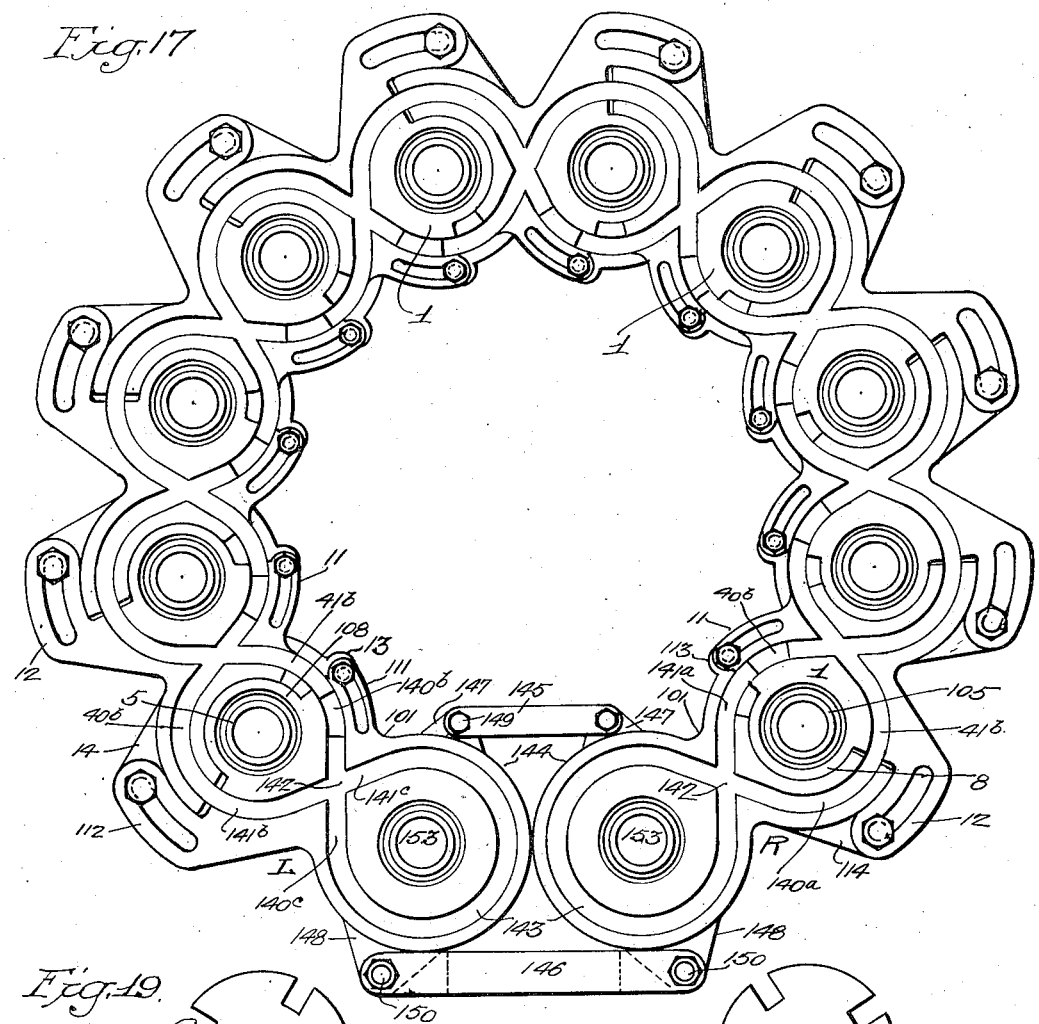
Figure 19:
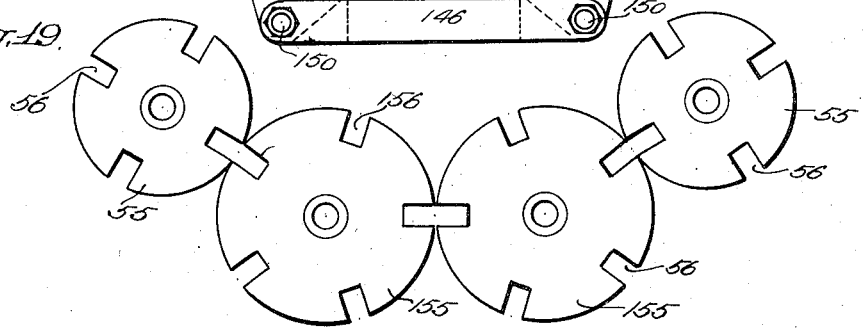
Figure 18:
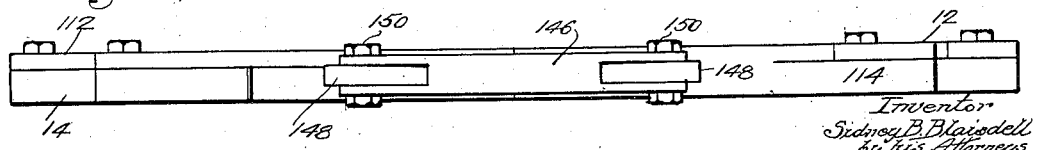

Fig. 6 is a right end elevation;
Fig. 7 is a longitudinal sectional elevation taken on the line 7—7, Fig. 2;
Fig. 8 is a transverse sectional elevation taken on the line 8—8, Fig. 2;
Fig. 9 is a transverse sectional elevation taken on the line 9—9, Fig. 2;
Fig. 10 is a longitudinal sectional elevation similar to Fig. 7 showing a number of units joined together to form a complete bed plate;
Fig. 11 is a sectional elevation similar to Fig. 10 and showing the manner in which the carriers, the drive gears, and the drive discs are assembled, intermesh, and cooperate with the assembled units of the bed plate;
Fig. 12 is a plan view of the mechanism shown in Fig. 11;
Fig. 13 is an assembled plan view of a bed plate for a small commercial size (12 carrier) machine;
Fig. 14 is an assembled plan view of a bed plate for a large commercial size (72 carrier) machine;
Fig. 15 is a front elevation of the lower portion of a braiding machine having a bed plate made and supported in accordance with the principles of the present invention;
Fig. 16 is a sectional plan view taken on the line 16—16, Fig. 15;
Fig. 17 is a plan view of a modified form of base structure including return units for the thread carriers by which flat fabrics may be made on a circular braider;
Fig. 18 is an edge or front elevation of the base structure shown in Fig. 17;
Fig. 19 is a plan view of the carrier driving discs employed with the base structure shown in Figs. 17 and 18;
Fig. 20 is a plan view of a modified form of base unit;
Fig. 21 is a front elevation of the structure shown in Fig. 20;
Fig. 22 is a plan view of another modified form of base unit;
Fig. 23 is a front elevation of the structure shown in Fig. 22; and
Fig. 24 is a plan view of the structures of Figs. 20 and 21 combined to form together a single base unit.

As shown in Figs. 1 to 6, each bed plate unit 1 comprises a base section 2 and a supersection 3 respectively disposed below and above, and integrally united on, a mean horizontal plane C—C (see Fig. 3).

The base section 2 comprises a hub 5 which extends vertically from the top plane A—A of the unit 1 to the base plane E—E thereof; and a horizontal plate 6 which is formed integrally with the hub 5 and extends parallel to the mean plane C—C between said mean plane and the bottom plane E—E of the unit.

The supersection 3 comprises a horizontal plate 7 extending parallel to and between the mean plane C—C and a face plane B—B which is disposed midway between the top plane A—A and the mean plane C—C.

The face plate 7 of the supersection 3 is offset longitudinally of the unit 1 with respect to the base plate 6 of the base section 2, whereby a goodly portion of the face plate 7 at one end of the unit overhangs the one end of the base plate 6 in the form of a wing, while the portion overlying the base plate 6 is integrally connected to the base plate 6 at the mean plane C—C.

The overhanging or wing portion of the face plate 7 provides a wing hub 8 which has a bore 9 of a diameter substantially equal to the outside diameter of the base hub 5, whereby, when two of the units 1, 1 are put together in assembling a complete bed plate, the bore 9 of the wing hub 8 of one unit fits snugly over the base hub 5 of the next unit, as shown in Figs. 10 and 11, said wing hub 8 lying in a recess 10 formed between one side of the base hub 5 and the adjacent arcuate end edge 35 of the face plate 7 of the interconnected unit.

The overhanging portion of the face plate 7 of the supersection 3 is provided with an inner clamp wing 11 and an outer clamp wing 12 adapted respectively to overlie a base clamp lug 13 and a base clamp lug 14 on the base plate 6 of the base section 2 of the interconnected unit, when said units 1, 1 are assembled.

The units 1, 1 are adapted to be secured together in rigid relation to each other to provide a rigid bed plate by clamp bolts passing through arcuate slots 15 and 16 formed in the clamp wings 11 and 12 respectively of the one unit and threaded into tapped holes 17 and 18 formed in the base clamp lugs 13 and 14 respectively of the interconnected unit.

That end of the base plate 6 of each unit 1 which lies adjacent the wing hub 8 thereof is formed with vertical angularly spaced walls 19 and 20 which radiate from the axis $x$ of the wing hub 8 and which define the limits of a solid segmental end 21 on the base plate 6.

The opposite end of each unit is provided with a segmental cavity 22 defined by vertical angularly spaced walls 23 and 24 radiating from the axis $y$ of the base hub 5 of the unit. Between the radial walls 23 and 24 is a curved wall 25, which coincides with the outer wall of the base hub 5.

When the units are assembled to form a complete bed plate, the solid segmental end 21 of one unit fits within the segmental cavity 22 of the next unit and the concaved wall 26 of the one unit bears against the curved or convexed outer wall 25 of the base hub 5 of the interconnected unit 1.

Adjacent the opposite sides of the solid segmental portion 21 at the one end of each unit 1 are wing segments 27 and 28 which overhang and extend laterally from the radial walls 19 and 20 respectively and extend from said radial walls to the radial edge walls 29 and 30 of the plate 7. These wing segments 27 and 28 respectively overlie and operate on and within segmental areas 31 and 32 on the upper surface (plane C—C) of the base plate 6, disposed at the adjacent end of the interconnected unit, which are defined by and lie between the end walls 33 and 34 of the top plate 7 and the edges of the base plate 6 formed by the radial walls 23 and 24.

Each unit 1 is provided with a predetermined portion of a carrier guide groove 40 and a predetermined portion of a second and intertwining carrier guide groove 41, each of which is formed partly in the base plate 6 and partly in the top plate 7 of the unit.

The guide or cam grooves 40 and 41 include circular portions 40a—41a and 40b—41b formed concentric to the axes $x$ and $y$ of the wing hub 8 and base hub 5 respectively. The two grooves also include straight portions 40c and 41c tangent to and connecting the circular portions 40a, 40b and 41a, 41b respectively and which intersect each other at 42 intermediate the hubs 5 and 8.

When the units are assembled in a bed plate, the portions of the circular grooves falling within the wing segments 27 and 28 of the top plate 7 coincide with the portions of the circular grooves disposed within the segmental areas 31 and 32 respectively of the base plate 6 of the interconnected unit.

In assembling the units the wing hubs 8 are placed around the base hubs 5 of the next adjacent units until the required number of units is so joined together, whereupon the units are caused to pivot about the coinciding axes of their respective hubs until all axes are disposed on a circle common to all, whereupon the clamp bolts are pulled down tightly to clamp and rigidly secure the wings 11 and 12 of one unit to the lugs 13 and 14 of the next unit.

Due to the curved portions of the guide grooves around each of the hub axes $x$ and $y$ being of the same radii and due to the coinciding relation of the curved portions of the grooves in the wing segments 27 and 28 with respect to the curved portions of the grooves formed in the base section of the interconnected unit, regardless of the diameter of the common circle the axes of the assembled units may ultimately assume, the curved portions of the grooves will always maintain circular continuity of the grooves about said axes.

The minimum diameter of the above noted common circle is limited by the radial wall 19 of one unit engaging the radial wall 24 of the next interconnected unit; and the maximum diameter of said common circle is limited by the radial wall 20 of the one unit engaging the radial wall 23 of the next interconnected unit, as shown in Figs. 13 and 14 respectively.

The only differences in the three sets of units needed to form a bed plate for any machine between the 12 carrier size and the 129 carrier size resides in the relationship of the angular walls at the opposite ends of the units of the three sets respectively, and in the positions of the slots in the inner clamp wings of the units.

The bases of the grooves 40 and 41 are disposed in a common course plane D—D which is parallel to and midway between the mean plane C—C and the bottom plane E—E, in the base plate 6; and the guide-drive lugs 50 (see Fig. 11) on the carriers 51 are of sufficient length to pass down into the grooves 40 and 41 to a plane below the mean plane C—C at which the overlap between the wing segments 27 and 28 and the base plate segments 31 and 32 occurs, thus the guide lugs are forced to travel at all times in the groove 40 or 41 as the case may be to which they are respectively assigned.

The base hub 5 of each unit 1 (see Fig. 11) is bored axially at 52 for the reception of a sleeve shaft 53 of a drive gear 54. The pitch diameters of the drive gears 54 are equal to the distance between the axes $x$ and $y$ of the unit, thus, regardless of the diameter of the common circle on which the units are disposed, the drive gears are always maintained in true intermeshing relation to each other.

Resting on the top surface of the base hub 5 and secured to the upper end of the sleeve shaft 53 in each instance is a drive disc 55. Each disc 55 is provided with radial notches 56 for engaging a circular drive lug 57 formed on the carrier 51 between the guide lug 50 and the base 58 of the carrier 51.

The bases 58 of the carriers 51 rest on the top surfaces of the drive discs 55 and as the discs are relatively rotated by the intermeshing gears 54 the guide lugs 50, being elongated and substantially boat-shaped within the grooves 40 and 41, travel into the straight portions 40c—41c of the guide grooves and shift the carriers from one drive disc to the next to effect progression of the carriers along the intertwining grooves, in the usual manner common in braiding. The continuous circularly arranged train of intermeshing gears 54 may be driven in any suitable manner from outside the train.

Each base lug 14 of each unit 1 is provided with a second tapped hole 60, adjacent the clamp bolt opening 18, which also may be used for clamping purposes. By the provision of these two tapped holes in each unit 1 suitable supporting legs 61 (see Figs. 15 and 16) may be secured to the assembled bed plate at desired points around the bed plate. These tapped holes 18 and 60 may also be used for securing attachment brackets to the bed plate as, for example, for supporting the superstructure of the machine which includes the take-up mechanism; and for supporting the stop motion mechanism of the braiding machine. These tapped holes 18 and 60 may also be used for securing a power transmission mechanism to the bed plate by which the train of carrier drive gears 54 and the take-up mechanism of the machine may be driven.

As shown in Figs. 15 and 16 one side of the assembled bed plate composed of the rigidly interconnected units 1, 1 may be provided with a bracket 62 and at its opposite side with a bracket 63 in which are secured vertically extending standards 64, 64 which support and form part of the superstructure (not shown) of the machine.

The bracket 63 in the present instance includes a right angle arm 65 in which is secured a stud 66 for rotatably supporting a driving pulley 67. Secured to the pulley 67 is a beveled gear 68 which meshes with a similar beveled gear 69.

The gear 69 is loosely rotatably mounted on a vertical shaft 70 which is rotatably mounted in bearings 71 and 72 formed on or secured to the bracket 63.

Secured to the shaft 70 at one side of the bevel gear 69 is a spur gear 73 which meshes with one of the drive gears 54, above referred to.

The opposite side of the bevel gear 69 is provided with one section 74 of a drive clutch, the second section 75 of which is splined to the shaft 70.

The clutch half 75 is held in driving engagement with the clutch half 74 by a lever 76 and is held in such position by a latch 77.

The latch 77 is held by a horizontal lever 78 which is pivoted at 79 to the bracket 63 and is provided with a cam surface 80 arranged to be engaged by any one of the usual drop weights (not shown) which are carried respectively by the carriers 51 and assume a definite position thereon in the plane of the lever 78 in event of a thread breaking or becoming abnormally slack during the braiding operation, whereby the lever 78 will be rocked about its pivot and release the latch 77, permitting the clutch lever 76 to drop and thereby release the shaft 70 from the drive gear 69.

The vertical shaft 70 also drives the take-up and take-off mechanisms which are common to braiding machines and which in the present case are supported by the standards 64, 64.

Figs. 17, 18 and 19 illustrate a modified form of the invention wherein a number of the units 1 are used with return units 101, i. e., a pair of units, a right R and a left L, each of which is adapted to receive the carriers 51 from one of the guide grooves of the unit 1 connected therewith and to pass said carriers into the other guide groove of said unit, whereby flat braiding may be produced on a circular braiding machine.

The right unit R at one of its ends is similar in construction to that end of each unit 1 which is provided with the base hub 5, in that said end of the unit R is also provided with a base hub 105 to which is connected the wing hub 8 of the unit 1 which is attached to the unit R. The unit R is also provided with lugs 113, 114 which correspond to the lugs 13 and 14 of the unit 1, for cooperation with the lugs 11 and 12 respectively of the interconnected unit 1.

Concentric with the base hub 105, the unit 101R is provided with guide groove segments 140a, 141a which connect respectively with the guide grooves 41b and 40b of the interconnected unit 1, as clearly shown in Fig. 17.

The left hand unit L at one of its ends is similar in construction to that end of a unit 1 which is provided with the wing hub 8 in that it also is provided with a wing hub 108 which cooperates with the base hub 5 of the interconnected unit 1 and is also provided with wing lugs 111 and 112 which cooperate with the base lugs 13 and 14 respectively of the interconnected unit 1.

Concentric with the wing hub 108, the unit 101L is provided with guide groove segments 140b and 141b which cooperate with the groove segments 41b and 40b respectively of the interconnected unit 1.

The opposite end of each of the units 101, both right R and left L, is provided with a substantially 270° groove segment 143 which connects at its opposite ends respectively with the groove segments in the first mentioned ends of said units through straight sections 140c and 141c and which intersect at 142, thus forming the terminals or switch ends of the two intertwining carrier guide grooves of the machine whereby the carriers are switched from one of said serpentine paths into the other thereof.

The terminal ends 144 of the units 101, 101 are connected, in the present instance by links 145 and 146 which are bolted at 149 and 150 to lugs 147, 147 and 148, 148 respectively to complete the base plate of the machine and secure the sections or units thereof rigidly together.

Fig. 19 illustrates the driving discs 155 which are coaxially aligned with the axes 153, 153 of the terminal grooves 143, 143 of the units 101, 101 respectively, and whereas the drive discs associated with the units 1 are provided with but four radial slots 55 in the present instance the discs 155 are provided with five radial slots 156 to effect the reverse movements of the carriers in proper timed relation to produce a flat braided product.

Figs. 20, 21, 22, 23 and 24 illustrate two separate elements 201a and 201b which when combined form a single interchangeable unit 201.

The element 201a (see Figs. 20 and 21) is alike at both ends and each end corresponds to that end of the above noted units 1 which is provided with the base hub 5, in that the element 201a is provided with a pair of base hubs 205, 205.

The element 201b (see Figs. 22 and 23) is also alike at both ends and each end corresponds to that end of the above noted units 1 which is provided with the wing hub 8, in that the element 201b is provided with a pair of wing hubs 208, 208.

Each element or section 201a is provided with a pair of lugs 213, 213 and a pair of lugs 214, 214 which correspond to the lugs 13 and 14 respectively of the units 1; and each section or element 201b is provided with a pair of wing lugs 211, 211 and a pair of wing lugs 212, 212 which correspond respectively with the lugs 11 and 12 of the units 1.

When the two sections 201a and 201b are assembled to form a single interchangeable unit 201, as shown in Fig. 24, one of the wing hubs 208 of the section 201b fits over one of the base hubs 205 of the section 201a, one of the wing lugs 211 of the section 201b overlaps and is secured to one of the base lugs 213 of the section 201a, and one of the wing lugs 212 of the section 201b overlaps and is secured to one of the base lugs 214 of the section 201a, thus the complete unit 201 is provided at one end with a wing hub 208, a wing lug 211, and a wing lug 212, corresponding respectively with the corresponding parts 8, 11 and 12 of a unit 1, and at its opposite end the unit 201 is provided with a base hub 205, a base lug 213 and a base lug 214 corresponding to the parts 5, 13 and 14 of the units 1, thus the complete unit 201 may be inserted in a complete base plate in place of one of the units 1 or a number of the units 201 may be secured together to form the complete bed plate.

I claim:

1. A braiding machine comprising a bed plate provided with a pair of intertwining carrier guide grooves, said bed plate comprising a plurality of similar interconnected interchangeable units respectively provided with complete intercommunicating portions of said guide grooves.

2. A braiding machine comprising a bed plate provided with a pair of intertwining carrier guide grooves, said bed plate comprising a plurality of similar pivotally interconnected interchangeable units respectively provided with complete intercommunicating portions of said guide grooves concentrically disposed with respect to the pivotal axes of said units respectively.

3. A braiding machine comprising a bed plate provided with a pair of intertwining carrier guide grooves, said bed plate comprising a plurality of similar pivotally interconnected interchangeable units respectively provided with complete intercommunicating portions of said guide grooves concentrically disposed with respect to the pivotal axes of said units respectively, and means for rigidly securing said interconnected units one to another in predetermined angular relation to each other about said axes.

4. A braiding machine comprising a bed plate provided with a pair of intertwining carrier guide grooves, said bed plate comprising a plurality of similar pivotally interconnected interchangeable units respectively provided with complete intercommunicating portions of said guide grooves concentrically disposed with respect to the pivotal axes of said units respectively with the pivotal axes of said units disposed on a common circle.

5. A braiding machine comprising a substantially annular bed plate provided with a pair of intertwining carrier guide grooves, said bed plate comprising a plurality of similar interconnected interchangeable units respectively provided with complete intercommunicating portions of said guide grooves.

6. A braiding machine comprising a substantially annular bed plate provided with a pair of intertwining carrier guide grooves, said bed plate comprising a plurality of similar pivotally interconnected interchangeable units respectively provided with complete intercommunicating portions of said guide grooves concentrically disposed with respect to the pivotal axes of said units respectively with the pivotal axes of said units disposed on a common circle concentric to the axis of the annulus.

7. A braiding machine comprising a bed plate provided with a pair of intertwining carrier guide grooves, said bed plate comprising a plurality of similar interconnected interchangeable units respectively provided with complete intercommunicating portions of said guide grooves, and a terminal unit at each end of said plurality of units and provided with a return groove portion communicating with each of said intertwining guide grooves.

8. A braiding machine comprising a bed plate provided with a pair of intertwining carrier guide grooves, said bed plate comprising a plurality of similar interconnected interchangeable units, each unit comprising a pair of interconnected relatively adjustable elements respectively provided with complete complementary intercommunicating portions of said guide grooves.

9. A braiding machine comprising a bed plate provided with a pair of intertwining carrier guide grooves, said bed plate comprising a plurality of similar interconnected interchangeable units with at least one of said units consisting of a pair of interconnected relatively adjustable elements respectively provided with complete complementary sections of said guide groove portions of the unit.

10. A braiding machine comprising a bed plate provided with a pair of intertwining carrier guide grooves, said bed plate comprising a plurality of similar interconnected interchangeable units respectively provided with complete intercommunicating portions of said guide grooves, means for supporting the fabricated bed plate, and means forming part of each unit affording attachment for said supporting means to said bed plate.

11. A braiding machine comprising a bed plate provided with a pair of intertwining carrier guide grooves and a superstructure above said bed plate, said bed plate comprising a plurality of similar interconnected interchangeable units respectively provided with complete intercommunicating portions of said guide grooves, and means forming part of each unit and affording support for said superstructure.

12. A braiding machine comprising a bed plate provided with a pair of intertwining carrier guide grooves and a series of carriers operable in each groove, said bed plate comprising a plurality of similar interconnected interchangeable units respectively provided with complete intercommunicating portions of said guide grooves, means for actuating said carriers along said grooves, means for driving said carrier-actuating means, and means forming part of each unit and affording attachment for said driving means to said plate.

13. A braiding machine comprising a bed plate provided with a pair of intertwining carrier guide grooves, carriers operable in said grooves, driving means for said carriers, means for supporting said bed plate, a superstructure above said bed plate, said bed plate comprising a plurality of similar interconnected interchangeable units respectively provided with complete intercommunicating portions of said guide grooves, and single means forming part of each unit and affording a means for rigidly securing the units together, attachment for said supporting means, attachment for said superstructure, and attachment for said driving means to said bed plate.

14. A braiding machine comprising a bed plate provided with a pair of intertwining carrier guide grooves, said bed plate comprising a plurality of pivotally interconnected interchangeable units each including complementary intercommunicating portions of each groove, said complementary portions of said guide grooves of adjacent interconnected sections including complete coinciding arcuate portions of said grooves concentrically disposed with respect to the pivotal axes of said interconnected units and intersecting portions of said grooves disposed intermediate said axes.

15. A braiding machine comprising a bed plate provided with a pair of intertwining carrier guide grooves, said bed plate comprising a plurality of pivotally interconnected interchangeable units each including complementary intercommunicating portions of each groove, said complementary portions of said guide grooves of adjacent interconnected sections including complete coinciding arcuate portions of said grooves concentrically disposed with respect to the pivotal axes of said interconnected units and intersecting portions of said grooves disposed intermediate said axes, carrier-supporting discs rotatably mounted in coaxial alignment with said pivotal axes respectively, and carriers supported by said discs and provided with guide shoes operable in said guide grooves.

16. A braiding machine comprising a bed plate provided with a pair of intertwining carrier guide grooves, said bed plate comprising a plurality of pivotally interconnected interchangeable units each including complementary intercommunicating portions of each groove, said complementary portions of said guide grooves of adjacent interconnected sections including complete coinciding arcuate portions of said grooves concentrically disposed with respect to the pivotal axes of said interconnected units and intersecting portions of said grooves disposed intermediate said axes, carrier-supporting discs rotatably mounted in coaxial alignment with said pivotal axes respectively with the peripheral edges of adjacent discs substantially tangentially disposed above said groove intersections, carriers supported by said discs and provided with depending lugs operable in radially disposed slots in said discs, and guide shoes operable in said guide grooves.

17. A braiding machine comprising a bed plate provided with a pair of intertwining carrier guide grooves, said bed plate comprising a plurality of pivotally interconnected interchangeable units each including complementary intercommunicating portions of each groove, said complementary portions of said guide grooves of adjacent interconnected sections including coinciding arcuate portions of said grooves concentrically disposed with respect to the pivotal axes of said interconnected units and intersecting portions of said grooves disposed intermediate said axes, carrier-supporting discs rotatably mounted in coaxial alignment with said pivotal axes respectively with the peripheral edges of adjacent discs substantially tangentially disposed above said groove intersections, carriers supported by said discs and provided with depending lugs operable in radially disposed slots in said discs, guide shoes operable in said guide grooves, and intermeshing gears for driving said discs and each having a pitch diameter substantially equal to the distance between said pivotal axes, adjacent gears intermeshing substantially in line with and below the groove intersections of said units.

18. A braiding machine bed plate provided with a pair of intertwining carrier guide grooves comprising a plurality of similar units each provided with a male element at one of its ends and a female element at its opposite end for axial aligned cooperation with the female and male elements respectively of adjacent units for pivotally connecting said units together and each including complete intercommunicating portions of said guide grooves.

19. A braiding machine bed plate comprising a plurality of similar units each provided with a male element at one of its ends and a female element at its opposite end for axial aligned cooperation with the female and male elements respectively of adjacent units for pivotally connecting said units together, said units having overlapping portions apertured correspondingly with respect to the axes of said pivot-forming elements for reception of threaded clamping means whereby said overlapping portions of interconnected elements may be rigidly secured together to maintain said units in predetermined angular relation to each other about each of said pivotal axes.

20. A braiding machine bed plate comprising a plurality of similar units each provided with a male element at one of its ends and a female element at its opposite end for axial aligned cooperation with the female and male elements respectively of adjacent units for pivotally connecting said units together, said units having overlapping portions apertured correspondingly with respect to the axes of said pivot-forming elements for reception of threaded clamping means whereby said overlapping portions of interconnected elements may be rigidly secured together to maintain said units in predetermined angular relation to each other about each of said pivotal axes, each unit having complementary portions of a pair of carrier guide grooves of said bed plate arranged with arcuate portions of said grooves at opposite sides of and concentric to the axis of each of said pivot-forming elements and intersecting portions intermediate said pivot-forming elements of each unit.

21. A braiding machine bed plate unit comprising a base section, a supersection overhanging said base section at one end of said unit and set-back over the base section at the opposite end of the unit, a pivot stud projecting from and perpendicular to the base section adjacent the set-back end of the supersection, and a pivot hub formed in the overhanging end of the supersection.

22. A braiding machine bed plate unit comprising a base section, a supersection overhanging said base section at one end of said unit and set-back over the base section at the opposite end of the unit, a pivot stud projecting from and perpendicular to the base section adjacent the set-back end of the supersection, and a pivot hub formed in the overhanging end of the supersection and with the set-back end of said supersection recessed concentrically to the axis of said pivot stud for reception of the pivot hub of another of said sections.

23. A braiding machine bed plate unit comprising a base section, a supersection overhanging said base section at one end of said unit and set-back over the base section at the opposite end of the unit, a pivot stud projecting from and perpendicular to the base section adjacent the set-back end of the supersection, a pivot hub formed in the overhanging end of the supersection, said unit being provided with carrier guide groove portions formed in and through the supersection and into the base section and including similar radii portions concentric with the axes of the pivot stud and pivot hub respectively, and intersecting portions intermediate said pivot stud and pivot hub.

24. A braiding machine bed plate unit comprising a base section, a supersection overhanging said base section at one end of said unit and set-back over the base section at the opposite end of the unit, a pivot stud projecting from and perpendicular to the base section adjacent the set-back end of the supersection, and a pivot hub formed in the overhanging end of the supersection, said base section having apertures on predetermined radii relative to said pivot stud and said supersection having apertures on corresponding radii relative to said pivot hub whereby the overhanging portion of one unit may be secured to the base section of another unit in overlapping relation one to the other.

25. A braiding machine bed plate unit comprising a base section, a supersection overhanging said base section at one end of said unit and set-back over the base section at the opposite end of the unit, a pivot stud projecting from and perpendicular to the base section adjacent the set-back end of the supersection, and a pivot hub formed in the overhanging end of the supersection, said pivot stud having an axial bore extending completely through said stud.

26. A braiding machine bed plate unit comprising a base section having a perpendicular pivot stud at each of its opposite ends, a supersection having a pivot hub at each of its opposite ends bored to fit the pivot lugs of the base section, said sections having complementary grooves formed on coinciding arcs concentric to the axes of said pivot studs and hubs respectively.

27. A braiding machine bed plate unit comprising a base section having a perpendicular pivot stud at each of its opposite ends, a supersection having a pivot hub at each of its opposite ends bored to fit the pivot lugs of the base section, said sections having complementary grooves formed on coinciding arcs concentric to the axes of said pivot studs and hubs respectively, and linear groove portions connected to said arcuate groove portions and intersecting each other intermediate said axes.

28. A braiding machine bed plate unit comprising a base section having a perpendicular pivot stud at each of its opposite ends, a supersection having a pivot hub at each of its opposite ends bored to fit the pivot lugs of the base section, said sections having complementary grooves formed on coinciding arcs concentric to the axes of said pivot studs and hubs respectively, and linear groove portions connected to said arcuate groove portions and intersecting each other intermediate said axes, said base section having apertures on predetermined radii relative to said stud axes and said supersection having apertures on corresponding radii relative to said hub axes whereby said base and supersections may be secured together in angular relation to each other about the axis of one of said studs.

SIDNEY B. BLAISDELL.